Patented May 7, 1935

2,000,240

UNITED STATES PATENT OFFICE 2,000,240

METHOD AND MEANS FOR SURFACING GLASS

Bernard Long, Paris, France, assignor to Societe Anonyme des Manufactures des Glaces & Produits Chimiques de Saint-Gobain, Chauny & Cirey, Paris, France No Drawing. Application December 16, 1933, Serial No. 702,723. In France December 17, 1932

2 Claims. (Cl. 51—278)

This invention relates to a method and means for surfacing glass and refers more particularly to a method and means for grinding mirrors and other sheet glass articles.

In the course of manufacturing plate glass materials, such as mirrors, the surfaces of these materials are first subjected to a grinding process and are then polished. The grinding process is usually subdivided into two steps, namely, the coarse grinding and the fine grinding or smoothing.

During the coarse grinding an abrasive material having comparatively large grains, such as sand, is applied to a glass surface. After the completion of the coarse grinding the same surfaces are subjected to a smoothing, which is usually performed by the same means and in the same way as the coarse grinding.

An important difference between the coarse grinding and the smoothing consists in that, for the latter an abrasive material having grains of a much smaller size is employed, such as emery or a sand consisting of very fine grains. It has been common practice to use extremely small and fine grains of emery or sand for the smoothing, i. e. grains which are capable of remaining in suspension for several hours and which may have in the average a diameter of five microns.

It has been suggested to use as abrasive materials mixtures of non-homogeneous substances, such as a mixture of emery, silicium-carbide and quartz, or a mixture of quartz and pulverized glass, or a mixture of sand, glass and porcelain with other materials, and many other mixtures of the same type. It was found, however, that such mixtures, as well as a mixture of sand and emery, cannot be used for the fine grinding or smoothing of glass surfaces due to the difference in the hardness and in the abrasive qualities of the individual components of each mixture. Non-homogeneous mixtures of this type do not smooth a glass surface properly, but leave irregular marks on the surface.

On the other hand, it was also found that even the use of a natural abrasive, for instance sand, emery, pumice and the like, does not always result in a properly smoothed glass surface, due to the fact that these materials are not sufficiently homogeneous and that it is not possible to determine previously the exact hardness of these materials.

Moreover in some instances, this failure to obtain a properly smoothed surface is caused by the fact that if an abrasive material having very fine grains is employed, the surface of the glass and the adjacent surface of the grinding block must be exactly parallel to each other; even small inclinations of one of these surfaces with respect to the other surface may result in an improperly smoothed glass surface, due to the fineness of grains of the abrasive material. It is extremely difficult, however, to arrange large glass plates and their supports in such a way that they will be exactly parallel to the block.

An object of this invention is the provision of a method of smoothing glass by an abrasive material, consisting of grains of a large size, the hardness of which may be determined previously.

Another object is the provision of an abrasive material which is cheap and easy to manufacture and the use of which will result in an extremely finely ground glass surface.

The above and other objects of the present invention may be realized through the use of homogeneous vitreous substances, such as glass, enamels or fused silica as abrasive materials for the smoothing of glass, each of these materials being used separately and not in a mixture with other materials.

In the preparation of the abrasive material, the glass or similar substance is first comminuted to form grains of various dimensions. Such grains are classified in different groups in accordance with their dimensions and depending upon the degree of fineness, which is to be accomplished by the smoothing.

The smoothing process consists in passing grains of glass or the like over the surface previously ground of a sheet of glass in the same manner, in which sand or emery were used heretofore.

An important advantage resulting from the use of glass as an abrasive material for the smoothing consists in the possibility of using grains of much larger dimensions than those of emery or fine sand.

Another advantage obtained through the use of different kinds of glass as abrasive materials, is the possibility of determining previously the hardness of the abrasive and its effect upon the surface of a glass plate. This is not possible if emery or sand are used, since grains of these materials have often different degrees of hardness.

By selecting abrasive materials consisting of grains of glass of a different kind, it is possible to vary the abrasive action within a range corresponding to that from 4.5 to 7.5 on the Mohs scale, on which various materials are arranged according to their degrees of hardness.

Experiments have shown that grains of glass of a relatively large size may be used for a very fine smoothing. Such grains can be easily classified in accordance with their effect on a glass surface. The sheet of glass and the grinding block do not have to be exactly parallel to each other, if relatively large grains of glass are used as the abrasive material.

It is generally known that the degree of fineness of a smoothing process may be measured by the limiting angle of incidence of a ray of light projected upon a smoothed surface in such a manner, that the smoothed surface seems reflectant to the eye of an observer placed in the direction of the reflected ray of light.

After a glass surface has been treated by an abrasive material consisting of grains of extremely fine emery, the measured limiting angle of incidence varies from 70° to 68°, depending upon the hardness of the treated sheet of glass. On the other hand, when an abrasive material is used, which consists of grains of glass having an average diameter of some tens of microns, the angle of incidence may be less than 65°.

What is claimed is:

1. In a process of producing plate glass materials, the surfaces of which are first subjected to a coarse grinding process and finally subjected to a polishing process, the intermediate step of subjecting these surfaces to a smoothing process after coarse grinding and before polishing, which step includes applying to the surface a homogeneous mixture of grains of granulated glass, the grains of which are about the same average hardness and particle size, said particle size being in excess of 5 microns and substantially less than 50 microns.

2. In a process of producing plate glass materials, the surfaces of which are first subjected to a coarse grinding process and finally subjected to a polishing process, the intermediate step of subjecting these surfaces to a smoothing process after coarse grinding and before polishing, which step includes applying to the surface a homogeneous mixture of grains of granulated glass, the grains of which are about the same average hardness and particle size, said particle size varying from 20 to 30 microns and said particles having a hardness of from 4.5 to 7.5 on the Mohs scale.

BERNARD LONG.